(12) United States Patent
Dittus

(10) Patent No.: US 7,172,302 B1
(45) Date of Patent: Feb. 6, 2007

(54) ELECTRONIC DEVICE WITH UV ILLUMINATION ARRANGEMENT

(75) Inventor: Dominik Dittus, Pforzheim (DE)

(73) Assignee: Timex Group B.V. (NL)

( * ) Notice: Subject to any disclaimer, the term of this patent is extended or adjusted under 35 U.S.C. 154(b) by 25 days.

(21) Appl. No.: 10/936,627

(22) Filed: Sep. 8, 2004

(51) Int. Cl.
*G01D 11/28* (2006.01)

(52) U.S. Cl. ........................ 362/28; 116/288

(58) Field of Classification Search ........... 116/288; 368/238; 362/23, 26, 27, 28
See application file for complete search history.

(56) References Cited

U.S. PATENT DOCUMENTS

| | | | |
|---|---|---|---|
| 3,490,226 A | | 1/1970 | Anderson et al. |
| 4,561,042 A | * | 12/1985 | Wehner et al. ............ 368/30 |
| 5,546,888 A | * | 8/1996 | Skiver et al. ............ 116/286 |
| 5,697,322 A | | 12/1997 | Hay et al. |
| 5,751,622 A | | 5/1998 | Purcell |
| 6,299,321 B1 | * | 10/2001 | Fuwausa ................. 362/29 |

2003/0112712 A1 * 6/2003 Ferri et al. ................ 368/238

FOREIGN PATENT DOCUMENTS

WO      WO 2004/034153 A2      4/2004

* cited by examiner

*Primary Examiner*—Renee Luebke
*Assistant Examiner*—Julie A. Shallenberger
(74) *Attorney, Agent, or Firm*—Carmody & Torrance LLP

(57) ABSTRACT

An indicator hand illumination arrangement for use in an electronic device that comprises a casing, a dial positioned in the casing, at least one indicator hand positioned intermediate the dial and a cover for at least in part protecting the at least one indicator hand and the dial, wherein the arrangement comprises a light emitting element coupled to the cover, for emitting lightwaves in the UV spectrum towards the at least one indicator hand and in a direction perpendicularly to the dial surface; wherein the at least one indicator hand has a proximate end that is coupled to a stem and a distal end, the at least one indicator hand having a top surface, an inner and outer bottom surface, and a angled surface angled non-perpendicularly to the angle of the lightwaves; such that lightwaves that emanate from the light emitting element deflect off of the angled surface and propagate in a direction towards the distal end of the at least one indicator hand.

15 Claims, 2 Drawing Sheets

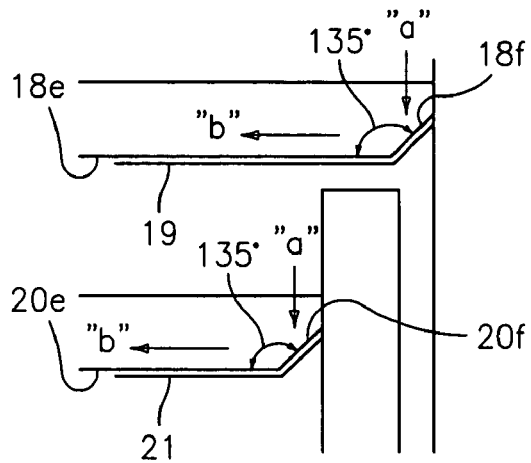
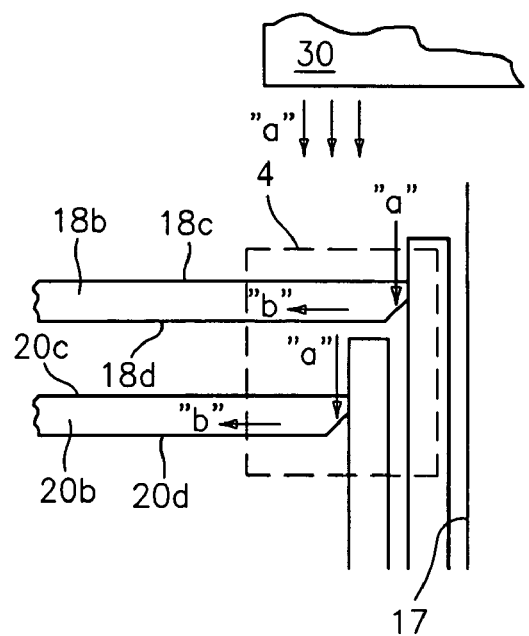
FIG. 4    FIG. 3
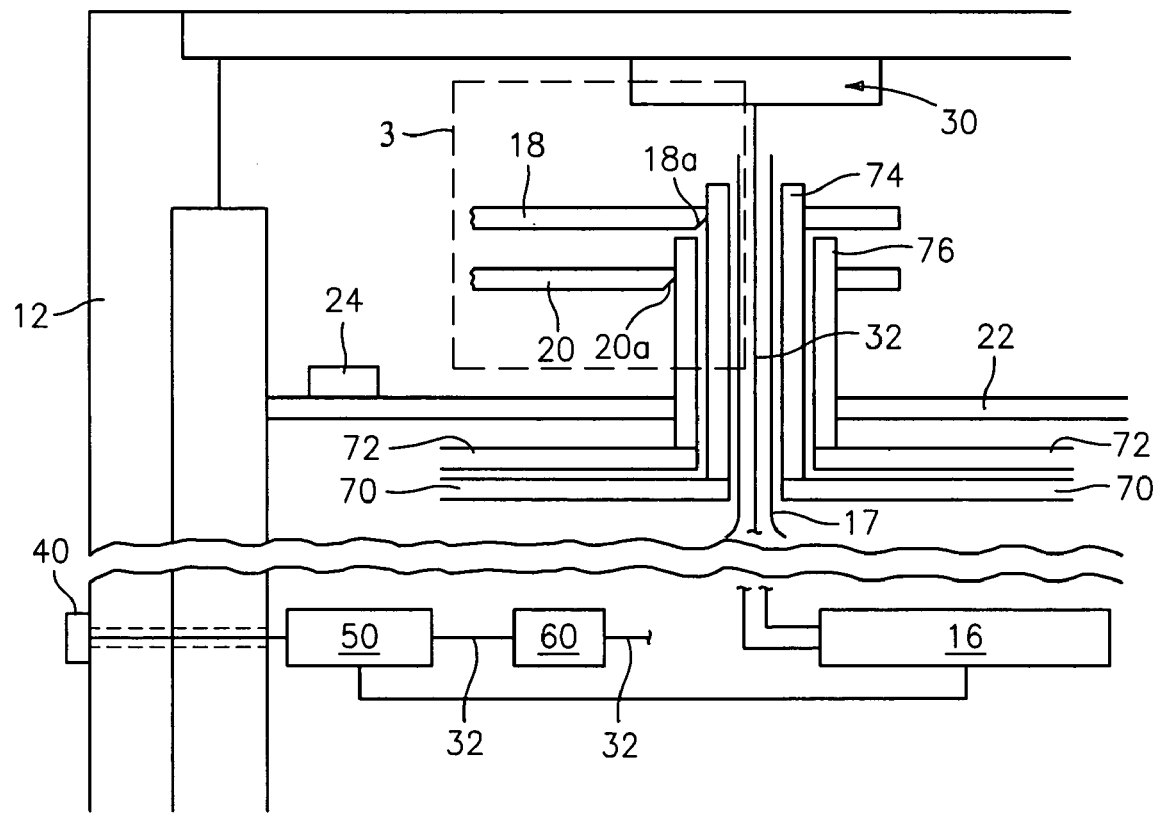
FIG. 2

ELECTRONIC DEVICE WITH UV ILLUMINATION ARRANGEMENT

BACKGROUND OF THE INVENTION

The present invention is directed generally to illumination arrangements in electronic devices, such as wristwatches (by example and not by limitation), and, in particular, to an improved illumination arrangement for illuminating elements in the device, such as one or more indicator hands, such as the hour and minute hand, by way of example.

The technology for illuminating the hands of an electronic device is quite varied. Some of the more readily accessible designs can be found in U.S. Pat. No. 3,490,226 (clock); U.S. Pat. No. 5,546,888 (gauges); U.S. Pat. Nos. 5,697,322; 5,751,622 and Published application No. 2003/0112712. Most of these technologies illuminate the hands from the bottom (i.e. from the dial side of the device).

The use of ultraviolet light to illuminate the hands of a timepiece is also known. For example, U.S. Pat. No. 4,561,042 and Published application No. WO 2004/034153 describe the use of a light emitting element mounted on the side of the case that in effect merely "blasts" ultraviolet lightwaves towards the hands of the timepiece to irradiate the surfaces of the hands causing them to emit visible light. However, both of these ideas are believed to be less than desirable due to their inability of most efficiently directing the light into the hands of the device.

Although the idea of providing a lightsource above the dial (as opposed to below or on the side) is known from U.S. Pat. No. 6,299,321, this patent also lacks any description or suggestion of most efficiently directing the light downwardly into the hands, as it too describes the mere idea of "blasting" light towards the hands.

There is also a need to overcome the perceived deficiencies in merely using an LED that emits light in the visible spectrum, as such devices do not provide for a satisfactory illumination of the hands, and they also use a considerable amount of energy, relatively speaking.

Accordingly, there is a need to provide an illumination arrangement for an electronic device, such as a wristwatch by example and not limitation, that provides for a more efficient illumination of the indicator hands using UV lightwaves. It is believed that the foregoing is best achieved by positioning such a UV light emitting element directly above the one or more indicator hands in the device and providing the one or more hands with an angled surface to more efficiently allow the lightwaves to propagate therethrough.

SUMMARY AND OBJECTIVES OF THE INVENTION

It is thus an objective of the present invention to overcome the perceived deficiencies in the prior art.

Specifically, it is an objective of the present invention to provide an improved illumination arrangement for an electronic device that provides for improved illumination of one or more indicator hands using UV lightwaves.

Moreover, it is an object of the present invention to provide such improvements in an electronic device, such as but not limited to, a wristwatch, although as will become clear below, the electronic device need not be limited to a watch.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, the present invention is, generally speaking, directed to an indicator hand illumination arrangement for use in an electronic device that comprises a casing, a dial positioned in the casing, at least one indicator hand positioned intermediate the dial and a cover for at least in part protecting the at least one indicator hand and the dial, wherein the arrangement comprises: a light emitting element coupled to the cover, for emitting lightwaves in the UV spectrum towards the at least one indicator hand and in a direction perpendicularly to the dial surface; wherein the at least one indicator hand has a proximate end that is coupled to a stem and a distal end, the at least one indicator hand having a top surface, an inner and outer bottom surface, and a angled surface angled non-perpendicularly to the angle of the lightwaves; such that lightwaves that emanate from the light emitting element deflect off of the angled surface and propagate in a direction towards the distal end of the at least one indicator hand.

In the preferred embodiment, the angle between the inner bottom surface and the angled surface is at least essentially 135°. In a specific embodiment, the light emitting element is adhered to the inside surface of the cover and is centrally mounted on the inner surface of the cover. In a particular construction, a timepiece comprising the above disclosure illumination arrangement is provided, wherein the at least one indicator hand comprises at least an hour and a minute hand for telling time.

BRIEF DESCRIPTION OF THE DRAWINGS

For a fuller understanding of the invention, reference is had to the following description taken in connection with the accompanying figures, in which:

FIG. 2 is a cross-sectional view taken about lines 2—2 of FIG. 1 most particularly illustrating an illumination arrangement for the electronic device constructed in accordance with the present invention;

FIG. 3 is an enlargement of the "dotted" section of FIG. 2; and

FIG. 4 is an enlargement of the "dotted" section of FIG. 3.

Figure 1:
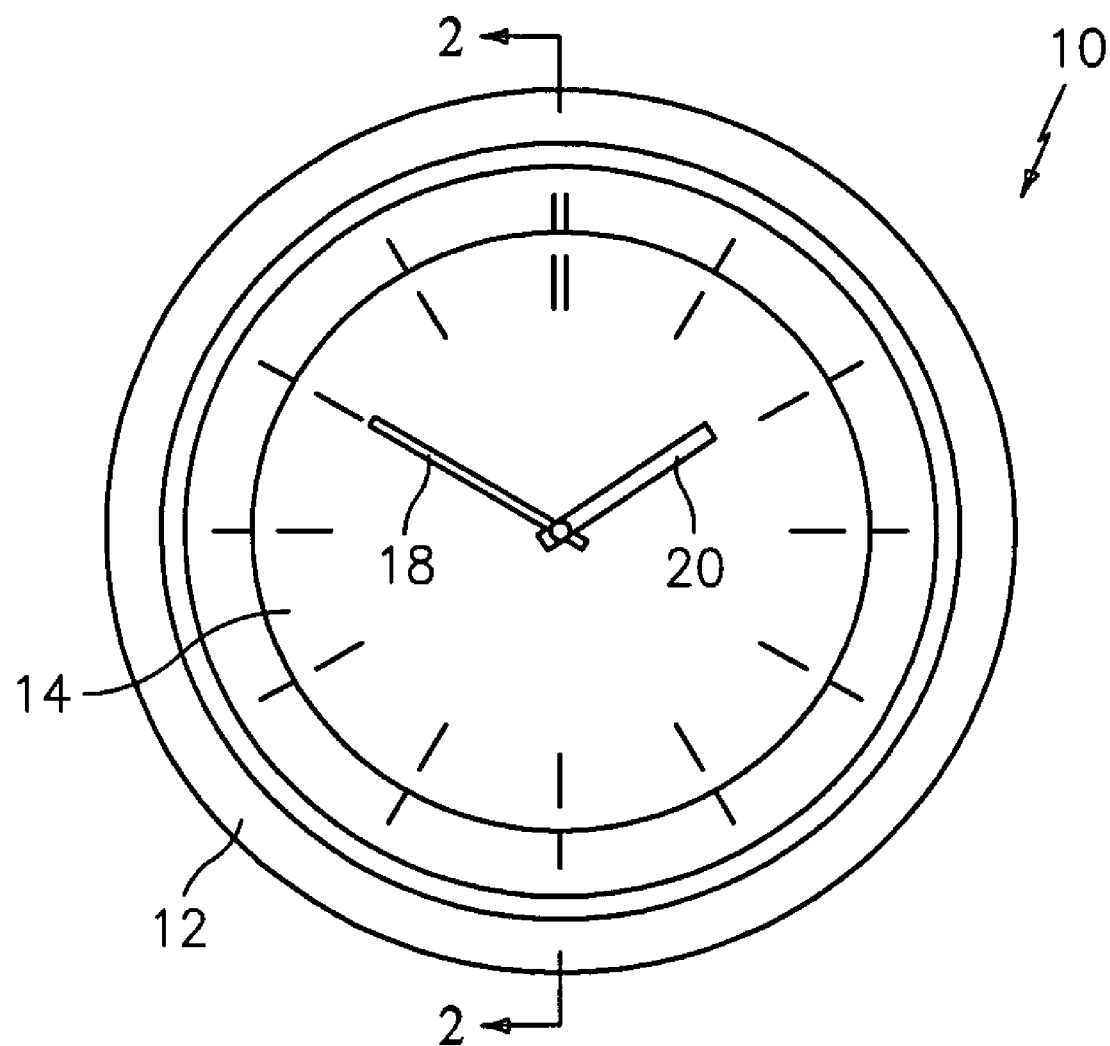
FIG. 1 is a simplified view of an electronic device constructed in accordance with the present invention.

Identical reference numerals in the figures are intended to indicate like parts, although not every feature in every figure may be called out with a reference numeral. Moreover, some elements have not been drawn to scale, so the relative size of such elements should not be used in a limiting sense, but rather in an exemplary sense to convey to the reader the features and elements that comprise the present invention.

DETAILED DESCRIPTION OF THE PREFERRED EMBODIMENTS

The present invention is directed to an illumination arrangement for an electronic device, which in the preferred embodiment, is a wristwatch. However, it should be understood that the present invention need not be a wristwatch, as other devices are very much contemplated hereby, and thus covered by the present claims. Reference should be made to co-owned and co-pending application Ser. No. 10/441,417, the disclosure of which is incorporated by reference as if fully set forth herein, which makes it clear that the device of the present invention can be a heartrate monitor and/or a compass, just to name a few.

Turning to the preferred embodiment, the Figures illustrate an electronic device, generally indicated at 10, constructed in accordance with the present invention. Device 10, which in the preferred embodiment is a wristwatch, comprises a watch case 12, a watch crystal 14, and an actuation mechanism, generally indicated at 16 and which in the preferred embodiment is a stepping motor, for controlling the rotation of a minute wheel 70 which in turn is operatively coupled to an hour wheel 72, as is well known in the art. Pinions 74, 76 which are coupled to minute and hour wheels 70, 72 respectively, receive conventional mechanical timekeeping hands 18 and 20, respectively, in a manner which is also well known in the art. Pinions 74, 76 are positioned on post 17. A dial 22 with time-information indicia 24 thereon is also provided in a well-known manner.

As the present invention is more particularly directed to a unique illumination arrangement for the illumination of hands 18 and 20 by a light emitting element, the details therefore will now be described.

The preferred light emitting element of the present invention, generally indicated at 30, is an LED belonging to the family of "smart" LEDs. The most suitable LED known at this time for the present invention is commercially known as an "enhanced optical power LED," marketed and sold under the ATON or OSRAM brand and/or tradenames.

The LED of the present invention emits invisible light in the ultraviolet ray region whose wavelength is in the range of 400 nanometers. Upon striking the florescent materials formed in the plastic itself of hands 18 and 20, visible light comprised of one or more of the prime (red, blue and yellow) colors is emitted, as would be known in the art and described for example in International Publication No. WO2004/034153 and U.S. Pat. No. 4,561,042, the disclosures of which are incorporated by reference as if fully set forth herein.

Compression of a side pusher or a crown, generically indicated by numeral 40 (although use of a crown to cause illumination is well known in the art, such as by way of example that which is described in U.S. Pat. No. 5,644,533 assigned to Timex Corporation, the disclosure of which is incorporated by reference as if fully set forth herein) closes a switch contact (not shown) inside case 12 of device 10, which in turn causes the actuation of light emitting element 30. To this end, device 10 preferably comprises a controller, generally indicated at 50, that among other things (such as for example, controlling the functionality of actuation mechanism 16 (see for example, controller 100 in the aforementioned application Ser. No. 10/441,417 which may be employed in the preferred embodiment herein) may be used to control the illumination of light emitting element 30 by having a simple resistive circuit, and is therefore electrically coupled to the switch contact actuated by pusher 40. A battery 60 provides the source of energy for light emitting element 30.

The preferred position of light emitting element 30 is directly above post 17 (e.g. at the geometric center of dial 22). A variety of wiring configurations are available. For example, the interior of post 17 may be utilized for running electrical wires 32 from the controller 50 and/or battery 60 to element 30. Alternatively, wires to element 30 may run along, or may be embedded in, the crystal, and then provided to run along the interior edge of the casing until they reach controller 50 and/or battery 60. Still further, an alternative embodiment may be in which element 30 is in physical electrical contact with one of the pinions (e.g. with a spring (e.g. leaf) contact), thereby requiring only one additional wire which similarly may run through post 17 or along (or embedded in) the crystal.

All of the foregoing are preferably ways to ensure that when pusher 40 is pushed, light-emitting element 30 is turned on. As would be known in the art, a timer circuit may be included in controller 50 so that the light emitting element remains on for a preselected time period (e.g. two seconds).

In the preferred embodiment, light emitting element 30 is attached, for example by an adhesive, to the inner surface of cover 14. In an alternate embodiment, light-emitting element 30 can be imbedded directly into cover 14, with electrical contact between element 30, on the one hand, and controller 50 and/or battery 60 on the other being made in any of the configurations set forth above.

In order to best appreciate the efficiency and advantageous nature of the present invention, the preferred material for hands 18 and 20 is a plastic material provided with florescent additives, which are activated by ultraviolet light. The florescent additives may be provided during the formation of the plastic itself. The present inventor believes that material marketed and/or sold under the brands "lisaplastic" and/or "luxacryl" is preferred.

Reference should now also be made to FIGS. 3 and 4 for ease of viewing the particular features to be hereinafter recited. Each hand 18 and 20 is comprised of a proximate end (18a and 20a respectively) that is coupled to post 17. Each hand 18 and 20 also has a distal end (18b and 20b, respectively). Moreover, each hand 18 and 20 has a top surface (18c and 20c, respectively), an inner and outer bottom surface (18d,e and 20d,e, respectively), and an angled surface (18f and 20f, respectively) angled non-perpendicularly to the angle of the lightwaves. To most clearly define the angled surface (18f, 20f) of hands 18 and 20, it is important to understand that the lightwaves emanating from light emitting element 30 are directed downwardly, as indicated by arrows "a." Having defined an angle that is "non-perpendicular" to the angle of the lightwaves is intended to mean an angle, for example shown in FIG. 4, whereby the angle between the inner bottom surface (18d, 20d) and the angled surface (18f, 20f) is at least essentially (if not exactly) 135°. This angle of 135° permits lightwaves that emanate from light emitting element 30 and which enter hands 18 and 20 to deflect off of the respective angled surface (18f, 20f) and propagate in a direction towards the respective distal ends 18b, 20b (i.e. in the direction of arrow "b"). To best achieve this objective, a layer of reflective material may be provided on either (or both) of the inner and outer surfaces of the angled surface (18f, 20f) to assist in such deflection and propagation of such light waves off of the angled surface and through the indicator hand(s). Clearly, if the hands are directly aligned with each other, it is not critical that lightwaves from light emitting element 30 reach both hands 18 and 20. In the foregoing way, lightwaves that enter the top surfaces 18c, 20c of hands 18 and 20 may pass through and deflect off of the angled surface towards the respective distal ends thereof.

To further promote the advantages of the present invention, a layer of reflective material (19, 21 respectively) may also be provided on either (or both of) the inner or outer bottom surface of each hand for reflecting lightwaves towards the interiors thereof.

It can thus be seen that the present invention provides for an improved illumination arrangement for the hands of a device, such as a timepiece, requiring only a relatively small amount of electrical energy while providing excellent viewability of the hands in low light conditions. Obviously, it is also within the scope of the present invention to provide other elements, such as the time indicating indicia 24 with florescent or luminescent material so they too may be irradiated and supplied with the appropriate excitation energy to keep them in an energized light-emitting state. The wavelength of the excitation source is only insofar important as it should be outside the range of visible light to avoid glares and also outside the range of x-rays because of health reasons. Since light emission always takes place at greater wavelength than the wavelength of the excitation energy, the excitation source should suitably have a wavelength between that of x-rays and that of visible light, that is, it should be between 100 nm and 500 nm. If also the relatively hard UV radiation and visible light are to be fully avoided, the wavelength of the excitation source should be between 320 nm and 450 nm.

What is claimed is:

1. An indicator hand illumination arrangement for use in an electronic device that comprises a casing, a dial positioned in the casing, at least one indicator hand positioned intermediate the dial and a cover for at least in part protecting the at least one indicator hand and the dial, wherein the arrangement comprises:
    a light emitting element coupled to the cover, for emitting lightwaves in the UV spectrum towards the at least one indicator hand and in a direction perpendicularly to the dial surface;
    wherein the at least one indicator hand has a proximate end that is coupled to a stem and a distal end, the at least one indicator hand having a top surface in facing alignment with the cover, an inner and outer bottom surface in facing alignment with the dial, and an angled surface angled non-perpendicularly to the angle of the lightwaves;
    such that lightwaves that emanate from the light emitting element travel through the top surface and into the at least one indicator hand deflect off of the angled surface and propagate in a direction towards the distal end of the at least one indicator hand.

2. The arrangement as claimed in claim 1, wherein the at least one indicator hand comprises fluorescent additives.

3. The arrangement as claimed in claim 1, wherein the light emitting element is adhered to the inside surface of the cover.

4. The arrangement as claimed in claim 3, wherein the light-emitting element is centrally mounted on the inner surface of the cover.

5. The arrangement as claimed in claim 1, wherein the light-emitting element is embedded in the surface of the cover.

6. The arrangement as claimed in claim 1, wherein including a layer of reflective material on one of the inner and outer bottom surface of the at least one indicator hand for reflecting lightwaves towards the interior of the at least one indicator hand.

7. The arrangement as claimed in claim 1, wherein the light-emitting element is a light emitting diode.

8. An electronic device comprising the illumination arrangement as claimed in claim 1.

9. A timepiece comprising the illumination arrangement as claimed in claim 1, wherein the at least one indicator hand comprises at least an hour and a minute hand for telling time.

10. An indicator hand illumination arrangement for use in an electronic device that comprises a casing, a dial positioned in the casing, at least one indicator hand positioned intermediate the dial and a cover for at least in part protecting the at least one indicator hand and the dial, wherein the arrangement comprises:
    a light emitting element coupled to the cover, for emitting lightwaves in the UV spectrum towards the at least one indicator hand and in a direction perpendicularly to the dial surface;
    wherein the at least one indicator hand has a proximate end that is coupled to a stem and a distal end, the at least one indicator hand having a top surface, an inner and outer bottom surface, and an angled surface angled non-perpendicularly to the angle of the lightwaves;
    such that lightwaves that emanate from the light emitting element deflect off of the angled surface and propagate in a direction towards the distal end of the at least one indicator hand;
    wherein the angle between the inner bottom surface and the angled surface is at least essentially 135°.

11. The arrangement as claimed in claim 10, wherein the lightwaves pass through the top surface of the at least one indicator hand and deflect off of the angled surface.

12. The arrangement as claimed in claim 11, including a reflective material provided on at least one of the inner and outer surfaces of the angled surface to facilitate the deflection of light waves off of the angled surface and propagation of the light waves in a direction towards the distal end of the at least one indicator hand.

13. An indicator hand illumination arrangement for use in an electronic device that comprises a casing, a dial positioned in the casing, at least one indicator hand positioned intermediate the dial and a cover for at least in part protecting the at least one indicator hand and the dial, wherein the arrangement comprises:
    a light emitting element coupled to the cover, for emitting light waves in the UV spectrum towards the at least one indicator hand and in a direction perpendicularly to the dial surface; and
    means, operatively coupled to the light-emitting element, for causing the light-emitting element to emit light waves in the UV spectrum;
    wherein the at least one indicator hand has a proximate end that is coupled to a stem and a distal end, the at least one indicator hand having a top surface in facing alignment with the cover, an inner and outer bottom surface in facing alignment with the dial, and an angled surface angled non-perpendicularly to the angle of the light waves;
    such that light waves that emanate from the light emitting element travel through the top surface and into the at least one indicator hand, deflect off of the angled surface and propagate in a direction towards the distal end of the at least one indicator hand.

14. The arrangement as claimed in claim 13, wherein the means comprises a pusher member operatively coupled to a controller, which itself is coupled to the light emitting element;
    wherein actuation of the pusher member causes the emission of said light waves from the light-emitting element.

15. The arrangement as claimed in claim 14, wherein the pusher member is either a side or top pusher or the crown.

* * * * *